Figure 6:
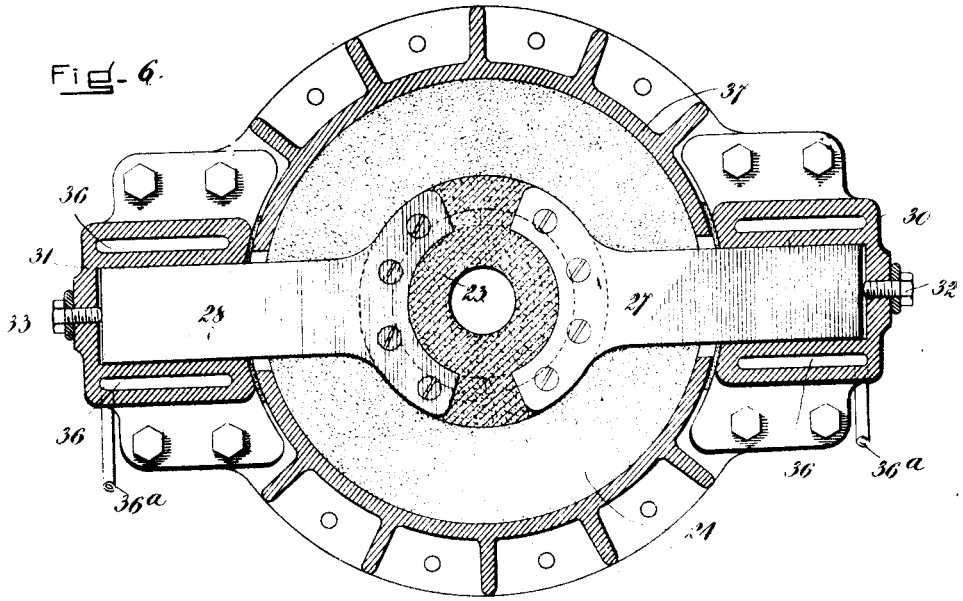

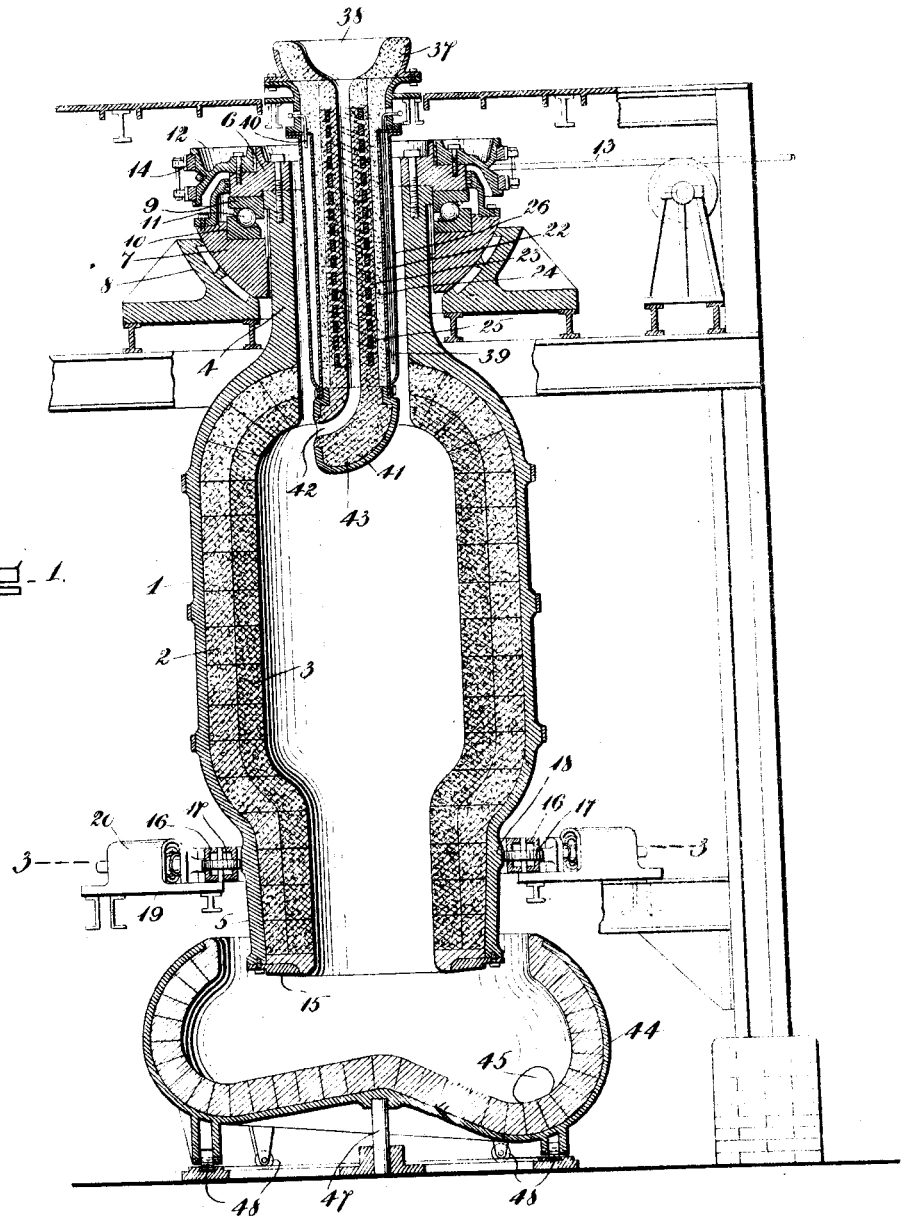

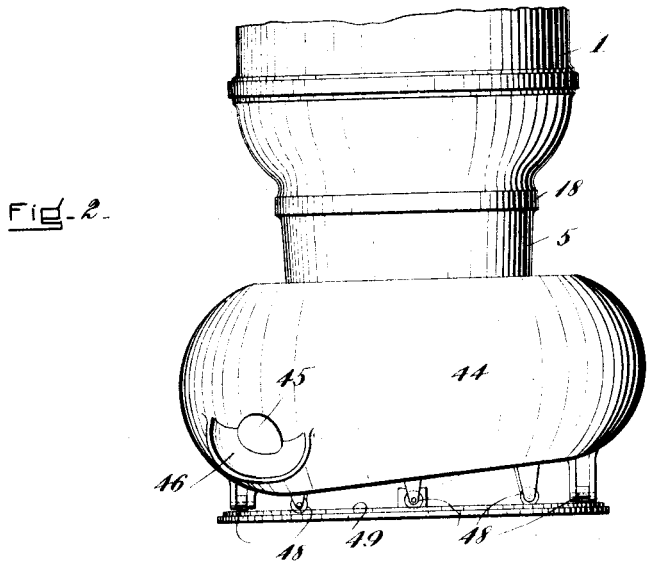
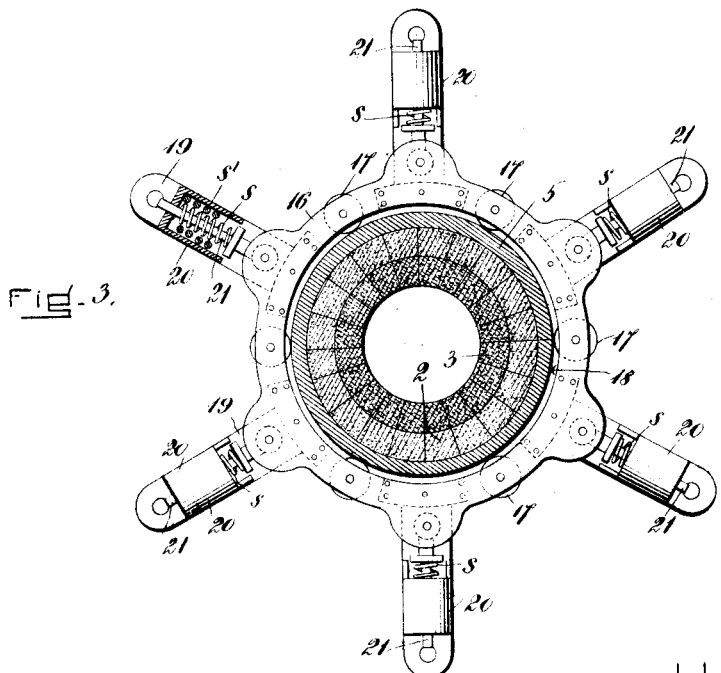

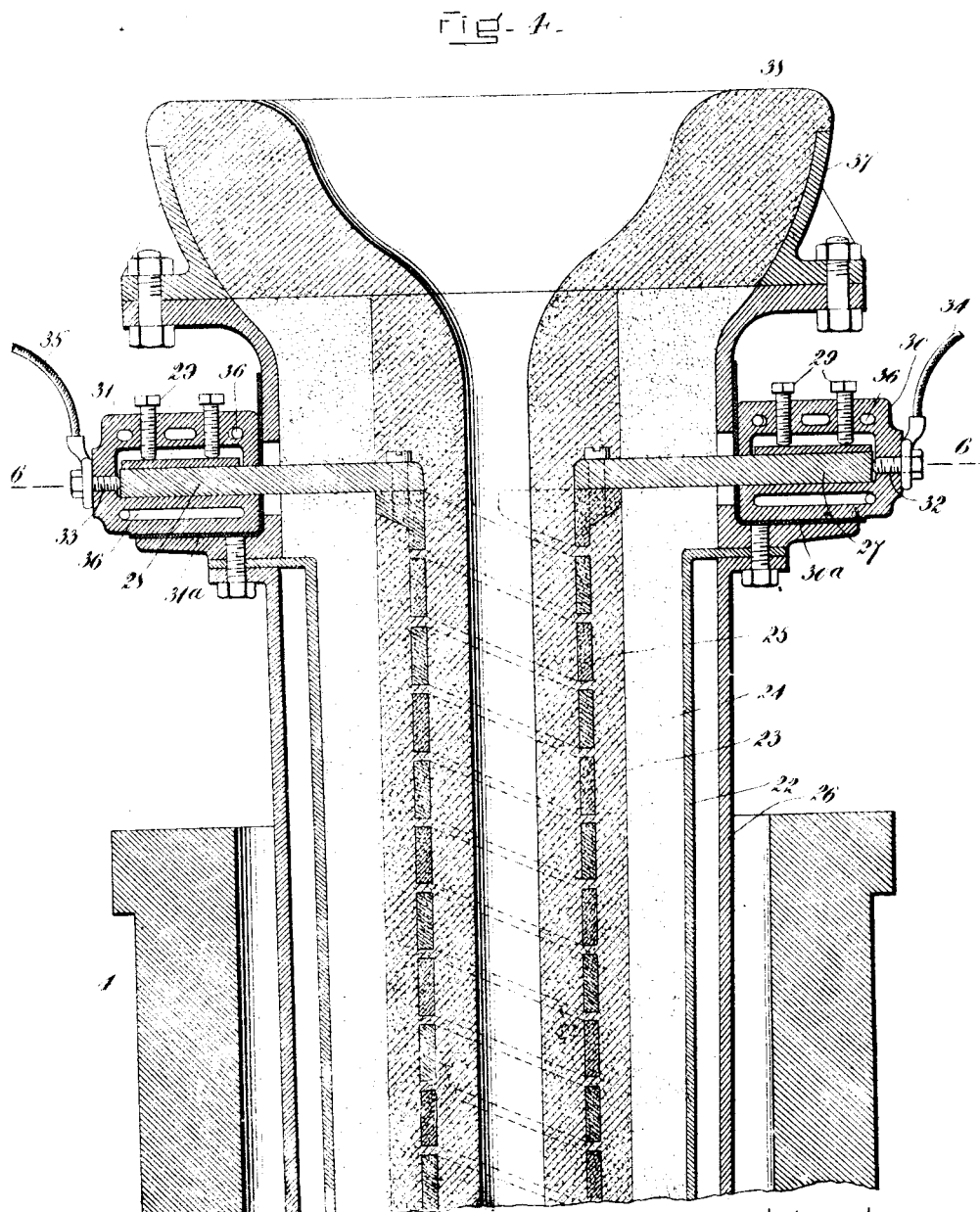

W. B. WESCOTT.
HIGH TEMPERATURE CENTRIFUGAL APPARATUS.
APPLICATION FILED MAR. 19, 1914.

1,196,829.

Patented Sept. 5, 1916.
4 SHEETS—SHEET 4.

WITNESSES:
INVENTOR:
William B. Wescott
By Roberts, Roberts & Cushman
Attorneys

UNITED STATES PATENT OFFICE.

WILLIAM BURTON WESCOTT, OF BOSTON, MASSACHUSETTS, ASSIGNOR TO KALMUS, COMSTOCK & WESCOTT, INCORPORATED, OF BOSTON, MASSACHUSETTS, A CORPORATION OF MASSACHUSETTS.

HIGH-TEMPERATURE CENTRIFUGAL APPARATUS.

1,196,829.  Specification of Letters Patent.  Patented Sept. 5, 1916.

Application filed March 19, 1914. Serial No. 825,798.

*To all whom it may concern:*

Be it known that I, WILLIAM BURTON WESCOTT, a citizen of the United States, and resident of Boston, in the county of Suffolk and State of Massachusetts, have invented new and useful Improvements in High-Temperature Centrifugal Apparatus, of which the following is a specification.

This invention relates to an apparatus for separating metals, mattes and speisses from their accompanying slags according to the method hereinafter described, while both the products to be separated one from the other are in molten condition.

In the art of smelting metals, such as copper, silver, lead, nickel, etc., from their ores, it is customary to deliver the fused products from the smelting furnace into a receptacle known as a settler. This settler consists of a tank lined with refractory material into which a stream of the molten material is delivered from the furnace. The molten material consists of two or more separable substances, such as metal, matte or speiss and slag. Of these substances slag, which consists of silicates, is a waste product of the smelting process and is intended to be thrown away. On the other hand, the metals, mattes or speisses constitute the valuable product of the smelting process and are intended to be recovered. In order to separate the valuable products from the valueless slag the usual practice is to deliver the mass containing these substances in a molten condition into the settler, and to allow them to remain in the settler in molten condition for a length of time sufficient to permit them to separate by gravity.

The slag has a lower specific gravity than the metal, matte or speiss, and under the condition described will separate, more or less imperfectly from the metal, matte or speiss, and will rise to the surface of the settler whence it can be poured off intermittently or continuously as desired. As the difference is specific gravity between metal, matte or speiss and slag is small, and as the time during which the molten products can be retained in the settler is limited on account of the loss of heat by radiation and the consequent cooling and thickening of the molten material, it follows that under the conditions of separation as heretofore practised the separation of the slag from the metal, matte or speiss is imperfect, slow and unsatisfactory. The slag carries off with it a certain amount of the metal, matte or speiss in the form of minute drops or molten particles, which, in the limited time afforded for separation by gravity, have not had an opportunity to collect and fall through the molten slag to the bottom of the settler.

With the apparatus of the present invention a more efficient, economical and speedy method of separating slag from the metal, matte or speiss, is attained. The method performed by the apparatus involves subjecting the molten slag containing drops or particles of molten metal, matte or speiss, to the so-called centrifugal force of rotation while in superheated condition, thereby increasing the "gravities" acting on the particles and effecting a more perfect and speedy separation than has heretofore been possible.

In carrying out this invention it is necessary that the mass consisting of slag and the metal, matte or speiss, mechanically intermingled in the slag in the form of minute drops or particles, should be superheated, that is, brought to a temperature considerably higher than the temperature of the mass at its fusion point, for the reason that the mass at its fusion point is thick and viscous, but as its temperature is raised above the fusion point and the material superheated, its fluidity rapidly increases.

The outflowing material from the ordinary smelting furnace is usually at the required superheated temperature, but if it should be at too low a temperature upon issuing from the smelting furnace it may be superheated in a suitable auxiliary apparatus, such as an electric furnace, to render it sufficiently fluid for the subsequent treatment.

The essential condition is that the slag, whether treated in the usual smelting furnace or in an auxiliary apparatus, be brought to such high temperature that it will be substantially more fluid than at its fusion point, and that its fluidity shall sist during the remaining steps of the process. The mass is then introduced in superheated condition in a stream, either continuous or intermittent as desired, into a centrifuge, and there subjected to the so-called centrifugal force of rotation for separating the valuable constituents from the slag. The centrifuge is preferably open at both ends, and the superheated mingled mass is introduced at one end and the separated substance drawn off while in fluid condition at the other end, as hereinafter more particularly described.

Figure 5:
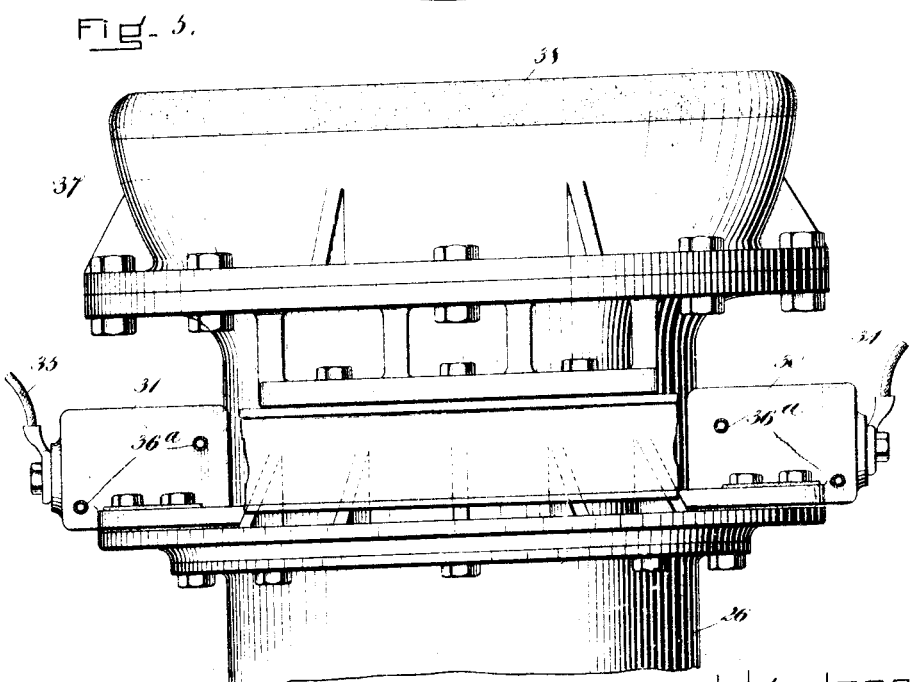

In the accompanying drawings which illustrate one embodiment of the invention, Figure 1 is a vertical, central section of a centrifugal separator apparatus suitable for performing the above described method; Fig. 2 is an elevation of the lower part of said apparatus, viewed from the rear of Fig. 1; Fig. 3 is a section on line 3—3 of Fig. 1; Fig. 4 is a vertical, central, section on an enlarged scale, of the upper part of the inlet pipe; Fig. 5 is a side elevation of the upper part of the inlet pipe shown in Fig. 4; and Fig. 6 is a section on line 6—6 of Fig. 4.

The centrifuge consists of a crucible, the body of which is preferably cylindrical, having an outer retaining shell 1 of steel, which furnishes the tensile strength of the structure, the heat-insulating wall 2, constructed of chrome brick, silica brick, or other heat-insulating material, and the inner wall or lining 3, constructed of bricks made of some highly refractory material capable of withstanding the excessive temperatures of the superheated mass to be treated, such as carbon, (amorphous or graphitic) magnetite, magnesite, alundum, etc., chosen according to the particular slag to be treated.

The crucible has at its upper end a hollow neck 4, of smaller diameter than the body of the crucible, through which the inlet pipe extends, and at its bottom end another hollow neck 5, which constitutes the outlet passage of the crucible. The insulating wall 2 and heat resisting lining 3 are continued downward to the end of neck 5. The interior diameter of the outlet neck is a little greater than the interior diameter of the inlet neck 4, so that the overflow of the contents of the crucible when the latter is revolving, as hereinafter described, will take place through the outlet neck.

The centrifuge is suspended in a vertical position by a collar 6, which is securely fixed to the upper end of neck 4. The collar 6 is supported on a floating ring 7, which has a convex spherical exterior surface, resting in a corresponding concave spherical surface formed in the supporting cup 8. The centrifuge revolves on ball bearings between the collar 6 and the floating ring 7, comprising the bearing rings 9 and 10, and a row of balls 11. Thus, the centrifuge, suspended from its top, is not only revoluble on the ball bearings but, with the floating ring, is free to swing pendulum-like through small angles in any direction about the vertical, from the center of the supporting cup.

A driving pulley 12 is fixed to the collar 6, and is driven from any suitable source of power by a belt 13. Brake bands 14 operated in any well known manner coöperate with pulley 13 to check the rotation of the centrifuge. The central plane of said pulley, and the axis of rotation of said pulley, pass through the center of the spherical surface of the floating ring 7, and therefore the driving mechanism has no tendency to displace the axis of rotation from the vertical.

The outer shell of the lower neck 5 is slightly tapered, as shown in Fig. 1, excepting at the outlet end, where the inner surface adjacent to the lowermost course of bricks is cylindrical, and the bricks of the insulating and lining walls 2 and 3 will consequently be retained in place upon the principle of the arch, with the exception of the lowermost course of bricks, which is supported at the end of the neck by a ring 15 bolted to the end of the outer shell. The greatest wear, caused by the material flowing out of the crucible, comes at the outlet end of the lower neck, on the lowermost course of bricks and the ring 15,—hence provision by which the latter can readily be removed and replaced without disturbing the crucible as a whole.

Surrounding the lower neck 5 is a ring 16, in which are journaled a series of guide rollers 17, which run on an annular track 18 formed on the outer surface of the neck 5. The guide ring 16 and rollers 17 are held in position by brackets 19, each made with a housing 20 containing coil springs $s$ and $s'$, which coöperate with the housing 20 and a rod 21, pivoted to the ring 16 and sliding in the end of the housing, normally to urge the ring 16 and the suspended centrifuge toward its vertical position, while permitting freedom of motion of the centrifuge through small angles.

The inlet pipe extends downward through the upper neck 4, and consists of the shell 22, an inner lining 23 of refractory material such as boron nitrid or magnesite, and a heat insulating wall 24 between the outer shell and the inner lining, made of condensed vaporized silicon carbid, or other suitable material. The outside of the pipe is kept at a constant and comparatively low temperature by the water jacket 26, surrounding the shell 22, the heat loss to which is supplied by the resistance heater coil 25, of graphite or other suitable material embedded in the lining 23, and not from the superheated material flowing through. Water is introduced into the water jacket through pipe 39 extending nearly to the bottom of the water jacket, and is discharged from a point near the top of the water jacket through pipe 40 (Fig. 1), thus insuring a good circulation. The heater coil 25 is a double helical coil, returning on itself, its ends being connected to the two conductor plates 27 and 28, which are clamped by means of bolts 29 in boxes 30 and 31, to insure good electrical contact between plates 27 and 28, and boxes 30 and 31, respectively. Binding screws 32 and 33 enter the ends of said boxes thus connecting the heater coil through wires 34 and 35 with the heater circuit. The boxes 30 and 31 are insulated from the outer shell of the pipe by asbestos sheets 30ᵃ and 31ᵃ, and may be cooled by water circulated through passages 36 and pipes 36ᵃ. The top of the inlet pipe is provided with a funnel-like mouth consisting of the outer shell 37 secured to the upper end of shells 22 and 26, and lined with refractory material 38 similar to the lining 23. The delivery spout 41 of the inlet pipe, is made with a curved passage 42, through its refractory lining 43, as shown in Fig. 1, to deliver the incoming stream of molten material toward the side of the crucible. As this is the part of the inlet pipe which is subjected to the most wear by the stream flowing through it, the said delivery spout 41 is made removable from the rest of the pipe so that when worn it may be replaced by a new one.

Below the outlet neck of the crucible is a circular receiving vessel 44, lined with bricks of suitable heat-resisting material, having its side walls curved upwardly and inwardly, and surrounding the discharge end of neck 5. It will be observed that the under surface of the overhanging part of the curved side walls of the vessel 44 is about opposite the outlet end of neck 5, and curves gradually downward so that the swiftly moving stream of molten material issuing from the neck 5 in a nearly horizontal direction by reason of centrifugal action, strikes the overhanging top wall of the vessel 44 at an acute angle, thereby greatly reducing the wear which would result from the direct impact of the stream should it meet the walls of the vessel 44 in a more nearly perpendicular direction. The bottom of the receiving vessel 44 inclines helically downward toward an outlet port 45, formed at the lowest point of the vessel. A spout 46 is provided on the outside of the vessel to carry away the outflowing stream (Fig. 2). The vessel 44 is rotatable about a central shaft or stud 47 fixed to the floor, and is carried on rollers 48 which run on an annular track 49.

In operation, the stream of molten and superheated slag and metal, matte or speiss, is introduced from the reservoir or furnace (not shown) into the funnel-shaped mouth 38 of the inlet pipe, whence it passes through the inlet pipe and is delivered toward the cylindrical walls of the rotating crucible. The crucible is rotated about its vertical axis at a speed of about 500 revolutions per minute. The molten and fluid mass is taken up by the swiftly revolving crucible, and by reason of the centrifugal action assumes the form of a hollow approximate cylinder, occupying the body portion 1 of the crucible. The molten particles of metal, matte or speiss having a slightly greater specific gravity than the slag, gradually work their way to the outside of the hollow cylinder of molten material, while the slag comes to the interior. The slag thus separated, overflows through the outlet neck 5, into the receiver 44, whence it passes through port 45, into any suitable receptacle.

When it is desired to empty the centrifuge of the metal, matte or speiss collected at the outside of the hollow cylinder, the receiving vessel 44 is rotated until the spout 46 is directed toward the desired receptacle for holding the concentrated metal, matte or speiss, and then the speed of rotation of the crucible is slowed down by means of the brake straps 14 on pulley 12, and its contents discharged into the receiver 44 and thence to the receptacle where it is collected.

The supply of material through the inlet pipe may or may not be stopped, during the discharge of the crucible, as desired.

I claim:—

1. An apparatus for separating metals, mattes or speisses from their accompanying slags while in molten condition, comprising a crucible mounted to rotate on a vertical axis and having an outer retaining shell and a lining of refractory material within the shell, said rotary crucible having an inlet opening at its top and an outlet opening at its bottom, and an inlet duct extending through said inlet opening and terminating near the top of the crucible adapted to deliver material to be treated toward the top of the interior walls of the crucible body.

2. An apparatus for separating metals, mattes or speisses from their accompanying slags while in molten condition, comprising a crucible mounted to rotate on a vertical axis and having an outer retaining shell and a lining of refractory material within the shell, said rotary crucible having an inlet opening at its top and an outlet opening at its bottom, and an inlet duct extending through said inlet opening and having a removable delivery spout at its lower end terminating near the top of the crucible adapted to deliver material to be treated toward the top of the interior walls of the crucible body.

3. An apparatus for separating metals, mattes or speisses from their accompanying slags while in molten condition, comprising a rotary crucible having an outer retaining shell, and a lining of refractory material, said crucible having inlet and outlet openings, and an inlet pipe extending through said inlet opening and terminating near the top of the crucible, adapted to deliver material to be treated toward the top of the interior walls of the crucible body, said inlet pipe being lined with electrically non-conducting refractory material, and a resistance heater coil surrounding the inlet passage and embedded in said lining of non-conducting refractory material.

4. An apparatus for separating metals, mattes or speisses from their accompanying slags while in molten condition, comprising a rotary crucible having an outer retaining shell, said crucible having inlet and outlet openings, and an inlet pipe extending through said inlet opening, having an interiorly heat-insulated cooling jacket.

5. An apparatus for separating metals, mattes or speisses from their accompanying slags while in molten condition, comprising a rotary crucible having an outer retaining shell, said crucible having inlet and outlet openings, and an inlet pipe extending through said inlet opening, having an external cooling jacket, and a resistance heater coil between the cooling jacket and the inlet pipe passage.

6. An apparatus for separating metals, mattes or speisses from their accompanying slags while in molten condition, comprising a rotary crucible having an outer retaining shell, said crucible having inlet and outlet openings, and an inlet pipe extending through said inlet openings comprising a tubular retaining shell, an inner lining of refractory material, and a filling therebetween of heat-insulating material, and an external cooling jacket surrounding said shell.

7. An apparatus for separating metals, mattes or speisses from their accompanying slags while in molten condition, comprising a rotary crucible having an outer retaining shell, said crucible having inlet and outlet openings, and an inlet pipe extending through said inlet openings comprising a tubular retaining shell, an inner lining of refractory material, and a filling therebetween of heat-insulating material, an external cooling jacket surrounding said shell, and a resistance heater coil embedded in said inner lining.

8. An apparatus for separating metals, mattes or speisses from their accompanying slags, comprising a rotary crucible having a discharge opening, and a receiver lined with refractory material adapted to receive material centrifugally discharged from said discharge opening, having overhanging walls at an acute angle to the direction of movement of said material and horizontally opposite said discharge opening.

9. An apparatus for separating metals, mattes or speisses from their accompanying slags, comprising a rotary crucible having a discharge opening, and a receiver having walls which surround and are horizontally opposite said discharge opening, adapted to receive material centrifugally discharged from said discharge opening, the bottom surface of said receiver being helically inclined downward in the direction of rotation of said centrifuge, and an outlet passage leading from the lowest part of said bottom surface.

10. An apparatus for separating metals, mattes or speisses from their accompanying slags, comprising a rotary crucible having a discharge opening at its lower end, and a rotatable receiving vessel below said discharge opening having side walls surrounding and extending to a point substantially horizontally opposite said discharge opening.

11. An apparatus for separating metals, mattes or speisses from their accompanying slags, comprising a rotary crucible having a discharge opening at its lower end, and a receiving vessel below said discharge opening having side walls surrounding and extending to a point substantially horizontally opposite said discharge opening, said receiving vessel having an outlet port and being rotatable so as to direct the discharge of its contents through the outlet port in various directions.

12. An apparatus for separating metals, mattes or speisses from their accompanying slags, comprising a rotary crucible having a neck at its upper end with an inlet passage therethrough, an inlet pipe extending downward through said crucible neck, and a floating support comprising a concave spherical supporting member and a convex spherical floating member resting in said concave member, a bearing between the crucible neck and said convex floating member, both of said members and also said bearing member surrounding said crucible neck and the inlet passage and inlet pipe.

13. An apparatus for separating metals, mattes or speisses from their accompanying slags, comprising a rotary crucible having a neck at its upper end with an inlet passage therethrough, an inlet pipe extending downward through said crucible neck, and a floating support comprising a concave spherical supporting member and a convex spherical floating member resting in said concave member, a bearing between the crucible neck and said convex floating member, both of said members and also said bearing member surrounding said crucible neck and the inlet passage and inlet pipe, said inlet pipe having an external cooling jacket to protect the surrounding floating support and bearing from heat, and also having an internal heater coil to restore to the material in said pipe the heat lost through said pipe.

Signed by me at Boston, Massachusetts, this 14th day of March, 1914.

WILLIAM BURTON WESCOTT.

Witnesses:
ROBERT CUSHMAN,
G. WRIGHT ARNOLD.